No. 794,181. PATENTED JULY 11, 1905.
H. E. HUDSON.
SANITARY SHIELD.
MODEL. APPLICATION FILED SEPT. 23, 1903. RENEWED DEC. 5, 1904.
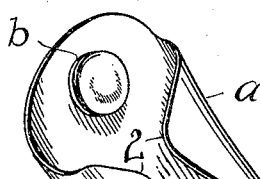
FIG. 1.
FIG. 2.
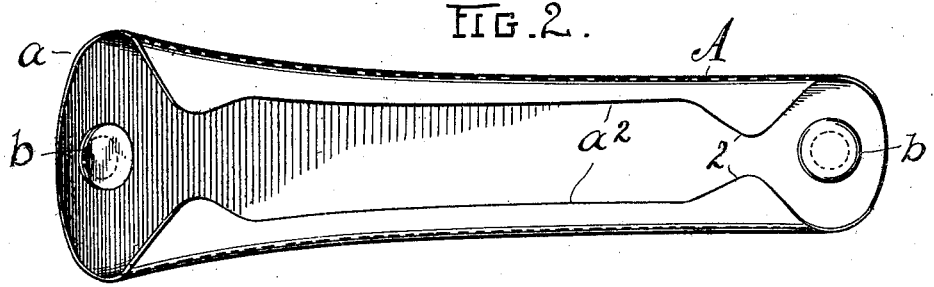
FIG. 3.
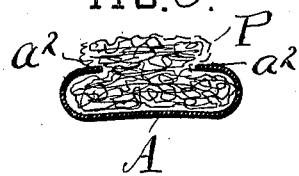
ATTEST.
R. B. Moser.
R. E. Moser.
INVENTOR.
Herbert E. Hudson
BY H. J. Fisher
ATTY No. 794,181.

Patented July 11, 1905.

UNITED STATES PATENT OFFICE.

HERBERT E. HUDSON, OF CLEVELAND, OHIO, ASSIGNOR, BY MESNE ASSIGNMENTS, TO THE SANITARY SHIELD AND MANUFACTURING COMPANY, OF CLEVELAND, OHIO.

SANITARY SHIELD.

SPECIFICATION forming part of Letters Patent No. 794,181, dated July 11, 1905.

Application filed September 23, 1903. Renewed December 5, 1904. Serial No. 235,505.

*To all whom it may concern:*

Be it known that I, HERBERT E. HUDSON, a citizen of the United States, residing at Cleveland, in the county of Cuyahoga and State of Ohio, have invented certain new and useful Improvements in Sanitary Shields; and I do declare that the following is a full, clear, and exact description of the invention, which will enable others skilled in the art to which it appertains to make and use the same.

My invention relates to a new and convenient sanitary shield adapted especially to be worn by women and constructed substantially as shown and described, and particularly pointed out in the claims.

In the accompanying drawings, Figure 1 is a perspective view of the shield, and Fig. 2 is a top plan view thereof. Fig. 3 is a cross-section of the shield with a portion of loose fibrous packing shown therein.

From these several illustrations of the shield the nature and use thereof will be obvious, and in order to serve its purpose aright the shield should be made of a material that will not absorb moisture and which will hold its shape and serve all its purposes without being changed or affected in any way by reason of its use. Hence I have found such material as gutta-percha, celluloid, or hard rubber admirably adapted for this purpose, because they are moisture-proof and will hold their form even though the shield be made very thin and light, as far as the material itself is concerned. Then, again, these materials are more or less flexible and contain something of the quality of accommodation, even though such function may not possibly be required or drawn upon in the use of a shield of this kind.

Structionally the shield-body A is curved on the segment of a circle lengthwise and widest at its front end $a$, as here shown and preferably, and between its ends the sides of the body are formed or rounded upwardly and the edges thereof are bent inward toward each other and partly overlap the space within the shield, substantially as shown. These edges or flanges are, furthermore, characterized by inward projections 2 at each end, which serve to confine or help to confine whatever packing P may be filled into the space within and between said flanges. The said packing may be of any suitable or available kind, dependent often on conditions, and may be any common absorbent cotton, procurable at dry-goods or drug stores, small pieces of linen or absorbent napkins, or even aseptic paper or like materials, and whatever is used can be discarded and the shield refilled as occasion requires. The exposure between the sides or flanges $a^2$ is sufficient for all purposes, and by having the said edges turned and as wide relatively as shown the packing, whatever it may be, is so covered and confined that practically only the smooth surface of the shield comes in contact with the person where chafing might otherwise be caused.

A further feature of the shield is a button $b$ at each end, by which attachment and detachment may be quickly effected, and any suitable suspensory means may be employed for sustaining the shield in place.

Altogether the shield is a thorough hygenic and antiseptic and when cleansed can be used over and over again for an indefinite period.

What I claim is—

1. The shield consisting of a hard non-absorbent material curved substantially on the segment of a circle lengthwise and provided with inturned edges along each side part way overlapping the body of the shield, the said shield having a continuous and unbroken bottom surface, thereby preventing leakage of moisture through the same, and constructed at its ends to attach supports substantially as shown and described.

2. The shield consisting of hard rubber or similar material curved longitudinally to conform to the person of the wearer and having a rounded edge along each side, said shield being provided with a continuous and unbroken bottom surface for preventing leakage therethrough and with a substantially open upper surface, means for retaining absorbent material within said shield and means for attaching supports thereto, substantially as described.

In testimony whereof I sign this specification in the presence of two witnesses.

HERBERT E. HUDSON.

Witnesses:
   H. T. FISHER,
   C. A. SELL.